United States Patent [19]
Rogers et al.

[11] 3,759,618
[45] Sept. 18, 1973

[54] METHODS OF AND APPARATUS FOR EFFECTING OPTICAL MEASUREMENT AND ANALYSIS

[75] Inventors: Gordon Leonard Rogers; Noel William Frank Stephens, both of Birmingham, England

[73] Assignee: National Research Development Corporation, London, England

[22] Filed: July 29, 1971

[21] Appl. No.: 167,280

[30] Foreign Application Priority Data
July 31, 1970 Great Britain.................. 37,145/70

[52] U.S. Cl........ 356/156, 250/237 G, 340/146.3 P
[51] Int. Cl. ......................................... G01b 11/00
[58] Field of Search.................. 356/114, 169, 170, 356/172, 156; 250/237 G; 340/146.3 P

[56] References Cited
UNITED STATES PATENTS
3,502,414  3/1970   Kreckel et al. ................. 356/169 X
3,001,081  9/1961   Bower................................ 356/169
3,218,911  11/1965  Bower et al....................... 356/169

Primary Examiner—David Schonberg
Assistant Examiner—Paul A. Sacher
Attorney—Cushman, Darby & Cushman

[57] ABSTRACT

Optical analysis, method and apparatus comprising a single photoelectric sensing means upon which the shadow of an optical grating is continuously cast through a composite grid having a plurality, preferably three, of different discrete sub-sections each having the same line repeat dimension and orientation but whose lines are progressively shifted relatively to those of the other sub-sections by chosen fractions of the line repeat dimension, and means for simultaneously casting the shadow of the optical grating on each of the sub-sections. There is also provided means for varying sinusoidally the intensity of the grating shadow incident upon each of the grid sub-sections so that the respective maxima and minima of the variations at such grid sub-sections are equally phase-displaced over the variation cycle, while means compares the resultant signal output from said photocell with a reference signal synchronised with the scanning cycle.

18 Claims, 10 Drawing Figures

METHODS OF AND APPARATUS FOR EFFECTING OPTICAL MEASUREMENT AND ANALYSIS

This invention relates to methods of and apparatus for effecting optical measurements and investigations or analysis and is more particularly concerned with an improved method of and apparatus arrangements for determining the position of an optical grid or grating, hereinafter referred to as a grating, or the position and contrast of the shadow cast by such grating.

There are a number of fields where it is necessary to determine the position of a grating. One of such fields is the use of moire patterns to control machine tools. Another field of use is the recognition of characters by amplitude and phase, such as by the method described in our prior U.S. Pat. application Ser. No. 758,969, filed Sept. 11, 1968 now U.S. Pat. No. 3,599,147 in which the shadow of an optical grating is formed and both its position and contrast have to be determined.

In the moire fringe case it is well known that the position of the main grating can be determined by allowing it to form broad moire fringes with a composite grid or grating, hereinafter for clarity referred to as a grid, containing four regions A, B, C and D. These regions have the same line spacing but suffer a 90° change of phase in line position from each to the next. The variation in light transmitted in each region as the main grating is moved is sinusoidal but the phases are such that the output signals can be supplied either to a C.R.T. display or to a reversible counter.

Similarly, the contrast and position of the shadow of a grating can be determined by a four sector composite grid in the case of character recognition in a manner more particularly described in "Optica Acta" Vol. 16, No. 5, December 1969, pages 535–553 and also with reference to FIG. 17 of the above-mentioned earlier patent specification.

All these arrangements require the use of four photodetectors, which have to be used in carefully balanced circuits, and the accuracy obtainable depends on their stability and, in particular, falls if the sensitivity of one detector changes without a corresponding change in the sensitivity of the others.

The present invention is concerned with an improved method and means whereby the output, information bearing, signal is derived from a single photoelectric detector, suitably placed behind a composite grid, and the signal obtained represents the contrast of the shadow by its amplitude and the position of the grating or shadow by its phase, relative to an available reference phase.

The method of determining the position of an optical grating or of the shadow cast thereby in accordance with the present invention comprises the steps of continuously casting the shadow of such grating on to a single photoelectric sensing means through each of the sub-sections of a composite grid whose separate sub-sections each have the same line repeat dimension and orientation as those of the grating but whose lines are progressively shifted relative to those of the other sub-sections by chosen fractions of the line repeat dimension sinusoidally varying the intensity of the grating shadow incident upon each of the grid sub-sections so that the respective maxima and minima of the sinusoidal variation at the grid sub-sections are equally phase-displaced over the variation cycle and then comparing the electric signal output from said photoelectric sensing means with a reference signal which fluctuates sinusoidally in synchronism with the shadow intensity variations cycle.

Apparatus in accordance with the invention comprises a composite optical grid which includes a plurality of separate sub-sections each having the same line repeat dimension and orientation as those of the grating but whose lines are progressively shifted relative to those of the other sub-sections by chosen fractions of the line repeat dimension, optical means for simultaneously casting the shadow of said optical grating on to each of said sub-sections means for varying sinusoidally the intensity of the grating shadow incident upon each of the grid sub-sections so that the respective maxima and minima of the variations at such grid sub-sections are equally phase-displaced over the variation cycle, a single photoelectric sensing means positioned to be responsive to the light of said cast shadow passing through each of said sub-sections, reference signal generating means for providing a reference signal which fluctuates in synchronism with the operation cycle of said intensity varying means and means for comparing the output signal from said photosensing means with said reference signal.

The necessary cyclic and repetitive shadow casting may be effected by changing a particular characteristic of the light directed towards the composite grid during each cycle from a single source, e.g., by altering its polarization direction or colour and then providing appropriate selection filters over each of the different sub-sections of the composite grid. Alternatively a plurality of separate light sources driven by an appropriate polyphase current source may be used, the selective illumination of each sub-section of the composite grid by its related source being achieved by the use of suitably isolated optical path providing means or filtering techniques such as by polarizing filters. Other means including holographic systems are also usable.

The invention will be more readily understood from the following more detailed description of a number of embodiments thereof given by way of illustrative example only and with reference to the accompanying drawings in which:

FIG. 9 is a schematic diagram, again similar to FIGS. 7 and 8, showing a simplified arrangement avoiding the use of filter means, while

Reference is also directed to the aforementioned earlier patent specification for a general explanation of certain basic method and apparatus features which may be involved in certain aspects of the present invention.

Figure 1:
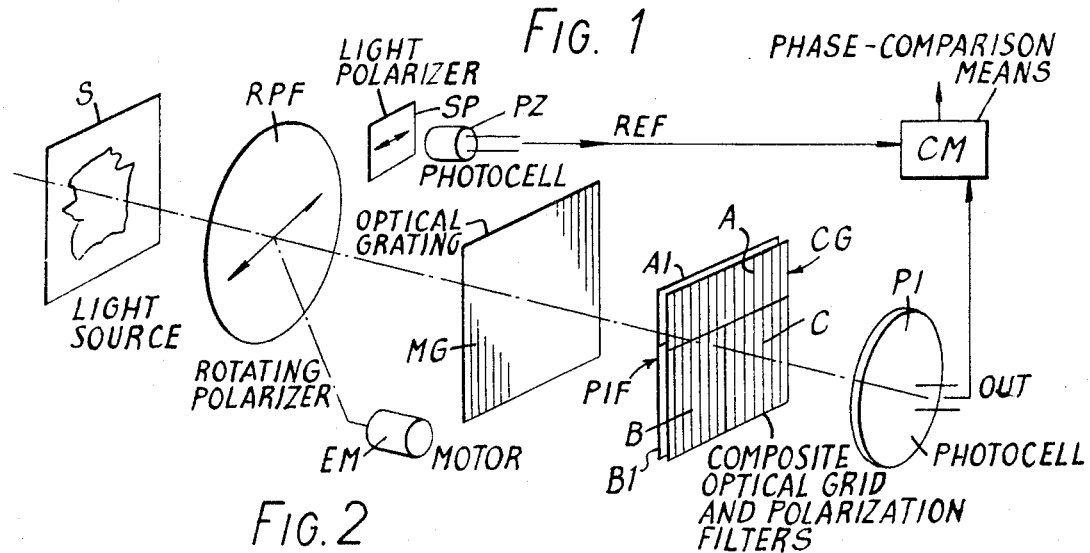
FIG. 1 is a generally schematic drawing of one optical investigation apparatus arrangement embodying the present invention.
Figure 2:
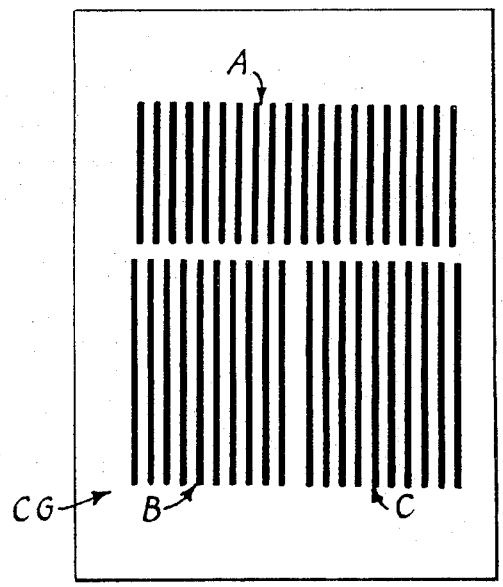
FIG. 2 is an elevational view of a composite optical grid as employed in the apparatus arrangement of FIG. 1.
Figure 3:
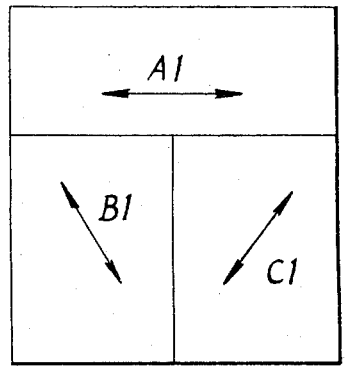
FIG. 3 is a diagram illustrating the form of a light polarizing filter used in conjunction with the optical grid of FIG. 2 in the apparatus arrangement of FIG. 1.

Referring first to the embodiment of the present invention shown in FIGS. 1, 2 and 3, a composite grid somewhat resembling that described in the aforesaid earlier patent specification with reference to FIG. 17 of its drawings comprises only three areas or sub-sections as shown at A, B and C in FIG. 2, each sub-section having the same line repeat dimension and orientation as the others but the respective grid lines and spaces of the different sub-sections being so arranged as to be displaced sideways relative to the others by an amount equal to one-third of the line repeat dimension, corresponding to 120° change of phase. The sub-section areas of this grid are covered respectively by light polarizing filters which have their polarizing directions set at 60° to one another, as shown in FIG. 3 of the drawing at A1, B1 and C1.

The complete arrangement of this embodiment is shown in FIG. 1 wherein S indicates a light source from which light passes through a disc RPF of light polarizing filter material. This disc is arranged for continuous rotation about an axis lying normal to the plane of the diSc by means such as an electric motor EM. The composite grid as already described with reference to FIG. 2 is shown at CG while the phase identifying filters A1, B1 and C1 associated with the respective sub-sections A, B and C of the composite grid are indicated at PIF. A single photocell positioned to be responsive to the light passing through the composite grid CG is shown at P1 and provides an output signal on leads OUT. The main or shadow casting grating MG will normally be placed between the source S and the composite grid CG.

The manner of operation of this embodiment is as follows: Assuming first that there is no main grating MG present. Owing to the continuous rotation of the light polarizing filter disc RPF, the polarization direction characteristic of the light from the source S incident upon the filter PIF in front of the composite grid CG will rotate through 360° during each rotation of the disc and, in consequence, will fall into alignment with the polarization direction of each of the filters A1. B1, C1 in turn twice during each disc revolution. The light incident upon each composite grid sub-section is thus effectively sinusoidally modulated at twice the frequency of rotation of the disc RPF and with the respective modulations phase displaced by 120° of each light modulation cycle (60° of each disc rotation cycle).

When no grating MG is present, the sinusoidal modulation of the illumination of three composite grid sub-sections will be so phased as to give a steady output from the single photocell P1, the latter being so adjusted in its position behind the system as to receive equal amplitude signals from the sub-section areas A, B and C of the composite grid CG. If a grating, such as MG, lies between the disc RPF and the composite grid CG with its filter PIF it will obscure more, say, of sub-section area A than of areas B or C and a fluctuating output signal is developed whose phase indicates this fact. As the grating MG shifts, the phase of the output signal OUT will also shift.

The necessary reference or zero of phase signal for comparison in suitable means, indicated schematically at CM, can either be derived from the shaft of the means driving the rotating polarizer RPF or by the output REF of a separate photodetector as shown at PZ located behind a stationary polarizer SP placed a little through to one side of the main beam from the source S through the rotating polarizer disc RPF.

The phase of the output signal represents the position of the grating or its shadow while the amplitude of the output signal represents the contrast of the shadow and thus the amplitude of the corresponding Fourier coefficient in applications such as those dealt with in the aforementioned earlier patent specification.

Such a system has great advantages in stability over previous systems and by the use of electro optical methods of rotating the plane of polarization of the source can be made operative up to frequencies in the megacycle region (Peek, Lang and Bouwhuis, S177, Lasers and Opto-electronics Conference, Southampton, March 1969).

One modification of the arrangements described above with reference to FIGS. 1, 2 and 3 employs a composite grid CG in which the sub-section areas A, B and C are not simple opaque and clear images, but are images formed on a polarizing base so that the clear regions each polarize in one of the directions at 60° to one another. Separate filter means such as PIF are not then required.

By printing grids on a series of layers of polarizing base it is also possible to construct a grating consisting of lines so interspersed that every third line polarizes in direction A, every third line in Direction B, and the remaining lines in direction C. Alternatively, such a grid can be made by cutting appropriate strips from a polarizing sheet and joining together.

Figure 4:
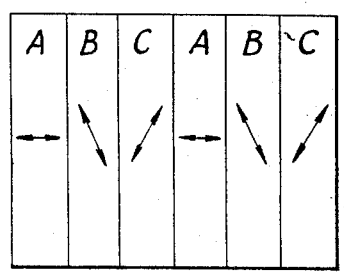
FIGS. 4 and 5 illustrate alternative constructional forms of the composite optical grid and its associated phase identifying filter means.
Figure 5:
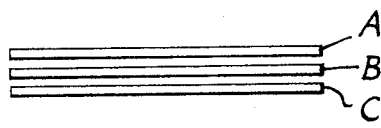

FIG. 4 illustrates one possible alternative form of composite grid formed of linear polarizing elements A, B, C which may be cut from sheet vectographic material and joined. FIG. 5 illustrates a form employing layered sheets of vectographic material.

Figure 6:
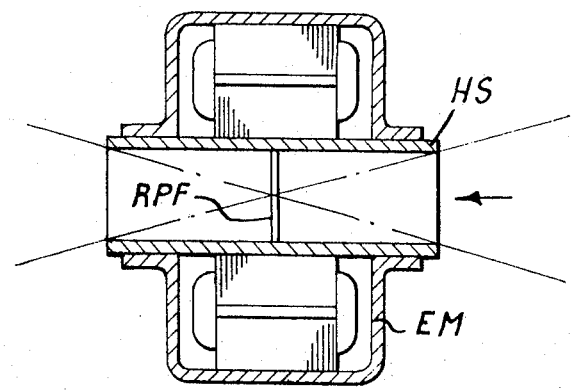
FIG. 6 shows one preferred form of the continuously rotating light polarizing filter disc shown in FIG. 1.

The rotating polarizing filter RPF of the arrangements shown in FIG. 1 is conveniently mounted, as shown in FIG. 6 inside the hollow armature shaft HS of an electric or other motor EM and the light passed down the motor shaft. While imposing some limit on the angle of the beam, such construction allows high speed to be obtained with the minimum centrifugal force. An alternative form of construction is to mount the polarizer disc upon the solid spindle of an electric motor whose outer diameter is less than the disc so that a beam may pass outside it. This provides a reasonable beam angle but at the expense of increased centrifugal force.

In another modification a fixed polarizer is associated with a rotating half-wave plate. This form of construction provides an effective scanning speed which is four times the shaft speed of the motor. By a suitable combination of half-wave plates, some fixed and some rotating, a further advantage can be obtained (Applied Optics 9 2396, 1970) and permitting a scanning speed which is 8 – 12 times the motor shaft speed.

As an alternative to an electric motor for driving or supporting the polarizing filter a suitable air turbine may be used.

Instead of mechanical scanning as described above, it is possible to generate a similar electronic singal by other, non-mechanical, means which are simpler, especially at high speeds. This simplicity overweighs the fact that an extra d.c. component may appear in the electronic circuit; this component can readily be filtered out.

Figure 7:
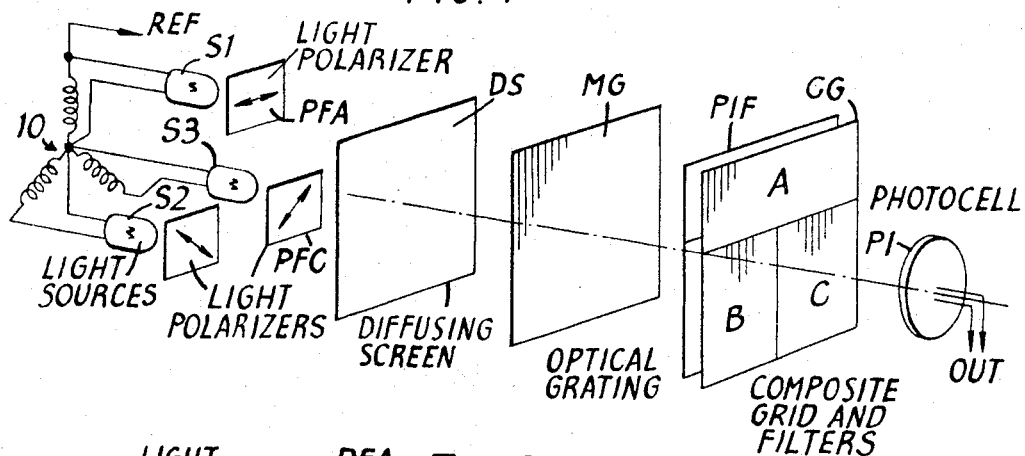
FIG. 7 is a schematic diagram similar to FIG. 1, showing an alternative system using non-mechanical scanning of the sub-sections of the composite grid.

One, non-mechanical, scanning system is shown in FIG. 7. In this embodiment three light sources S1, S2 and S3 are connected to be energized by the respective phases of a three-phase supply source 10. Each light source is provided with a polarizing filter PFA, PFB, PFC arranged with their polarization directions at 60° to one another. The light passing through these filters is directed on to a light diffusing screen DS. The light arriving at the screen DS is accordingly scattered and, if the material is suitable and the scattering angle not too large, it will be scattered without appreciable change of polarization. As the light from each lamp fluctuates with the a.c. supplied to it, the most prominent direction of polarization of the light from the far side of the screen DS cross fades from that of filter PFA to that of filter PFB and then to that of filter PFC and then back to that of filter PFA and so on in synchronism with the three-phase supply 10. It is preferred that the polarization direction of the filters PFA, PFB and PFC shall be parallel to or perpendicular to the areas A, B and C of composite grid CG. The other components are similar to those of FIG. 1 and bear corresponding reference characters. The reference signal REF can be derived from one of the phases of the source 10.

The source 10 may, for convenience, be the normal 50 cycle a.c. public supply mains. Alternatively, such source may be a purely electronic device based on a phase-shift or other type of oscillator with outputs differing 120° in phase. There is very little practical limits to the scanning speed then available provided appropriate light sources S1, S2, S3 are used. These sources may be neon or other gas discharge tubes, permitting speeds of up to several kilocycles. Alternatively photoemittive devices of the gallium-arsenide and galliumphosphide types may be used to provide speeds to 10 Mcs.

In order to modulate the light sources in such a manner that the luminous output follows a sinusoidal wave, it will normally be necessary to impose an alternating component upon a direct component to form the energizing circuit input to each lamp. This may give rise to a d.c. component in the eventual signal output. Fortunately the presence of a reasonable amount of d.c. component does not affect the electronics of the system as long as it is steady. It is therefore sufficient if the output of each lamp is of the form $I = K + A \sin(wt = \phi)$ where K's and A's are equal and the $\phi$'s increase by 120° for each lamp.

Figure 8:
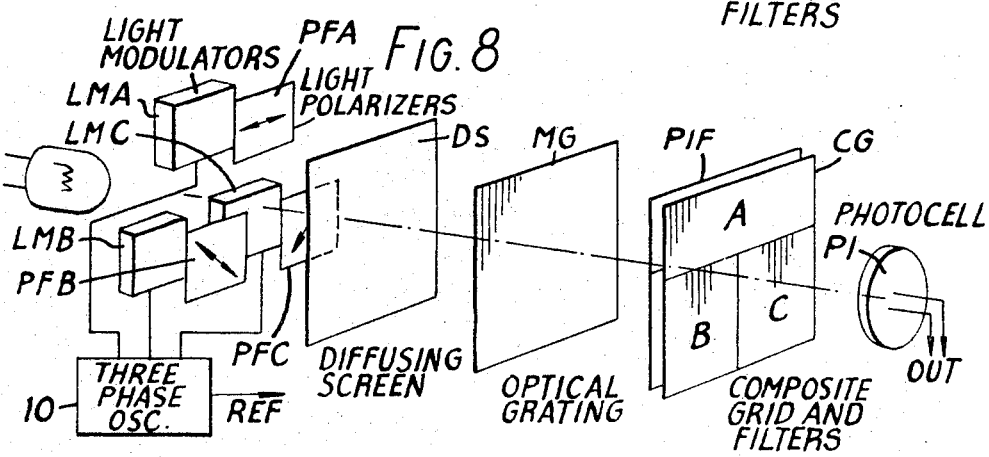
FIG. 8 is a schematic diagram, similar to FIG. 7, showing another embodiment.

Instead of employing separate light sources individually modulated as in FIG. 7, a single source operating to provide separate beams through individual modulator means may be used as shown in FIG. 8. In this modification, a single source S of constant intensity is used to illuminate light polarizing filters PFA, PFB and PFC through related modulated devices LMA, LMB, LMC controlled respectively by the three phases of the three-phase supply 10 shown in this case as an electronic oscillator. The remaining components are as in FIG. 7.

A similar effect can be obtained in the embodiments of FIGS. 7 or 8 if the filters PFA, PFB and PFC are colour filters (e.g., red, green and blue) and the co-operating filters A1, B1, C1 of PIF are also similar colour filters. Colour filtering could also be used in the system shown in FIG. 1 by using a rotating colour modulating disc in place of the polarizing filter disc RPF and substituting appropriate colour filters for the filters A1, B1, C1 of the filter PIF.

Figure 9:
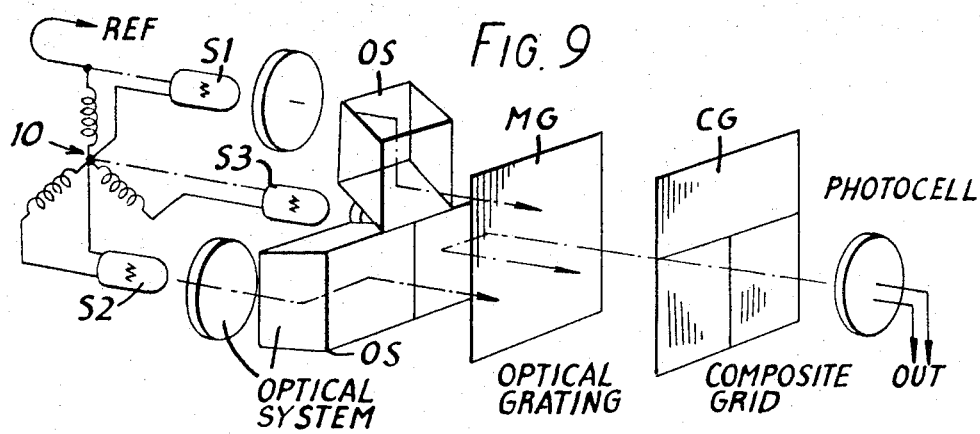

Another, simplified, arrangement suitable particularly for the control of machine tools and which does not use polarizers or other filter means, is shown in FIG. 9. In this embodiment the three lamps S1, S2, S3 are driven from the three-phase source 10 and are focussed by a system OS employing one or more lens and-/or prisms onto the composite grid CG so that each lamp illuminates only one of the sub-section areas A, B or C of the triple grid. In this embodiment no polarization filter PIF is required. The grating MG is placed just in front of the composite grid CG when motion of MG relative to CG will cause a change in the phase of the output signal from the photodetector P1 behind the grid CG. The zero of phase may be derived as before from the three-phase driving network.

It will be understood that there are other ways of "mixing" the scanning beams, suitable for this invention. For example, a holographic diffusing screen can be made by allowing three mutually coherent beams of sufficient cross section to strike a fine grained holographic plate at appropriate angles. When developed this can be made to project a beam from the three light sources in a direction equally inclined to each beam.

Figure 10:
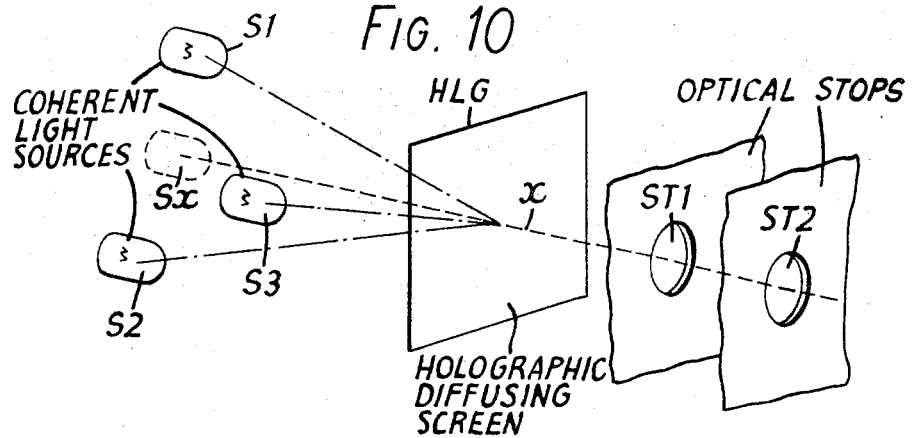
FIG. 10 is a diagram showing one form of holographic mixer suitable for incorporation in certain embodiments of the invention.

One form of such a holographic mixer is shown in FIG. 10 in which three light sources S1, S2, S3 are placed off axis to illuminate the hologram HLG, which has sets of fringes at 60°. These fringes, acting as gratings, develop a hexagonal lattice of virtual images of the three sources. By suitable design of the filter, a virtual image Sx of each source is formed on the axis x, which is equally inclined to the three illumination directions. Direct illumination from any of the sources S1, S2, S3 is prevented from reaching the subsequent apparatus by the provision of stops ST1, ST2 at the exit end of the generator. Polarizing filters (not shown) are placed directly in front of each lamp and are preferably arranged parallel to the fringe system which operates on that particular source. In this way the hologram does not affect the state of polarization of the beam as it goes through It will be apparent that many modifications may be made without departing from the scope of the invention. For example, while the described three-phase system of operation is preferred, other polyphase arrangements could be devised.

What we claim is:

1. The method of determining the position of an optical grating which comprises the steps of continuously casting a shadow of such grating on to a single photoelectric sensing means through each of the sub-sections of a composite grid whose separate sub-sections each have the same line repeat dimension and orientation as those of the grating but whose lines are progressively shifted relative to those of the other sub-sections by chosen fractions of the line repeat dimension, sinusoidally varying the intensity of the grating shadow incident upon each of said grid sub-sections so that the respective maxima and minima of the sinusoidal variations at such grid sub-sections are equally phase-displaced over the variation cycle and then directly comparing the electric signal output from said photoelectric sensing means with a reference signal which fluctuates sinusoidally in synchronism with the shadow intensity variation cycle.

2. The method according to claim 1 which includes the steps of cyclically changing a chosen characteristic of the light used to cast said shadow during each intensity variation cycle and then selectively filtering the light available at each of the different sub-sections of said composite grid.

3. The method according to claim 2 in which the cyclically changed characteristic is the direction of polarization of the light.

4. The method according to claim 2 in which the cyclically changed characteristic is the colour of the light.

5. Apparatus for determining the position of an optical grating or of the shadow cast thereby which comprises a composite optical grid which includes a plurality of separate sub-sections each having the same line repeat dimension and orientation as those of the grating but whose lines are progressively shifted relative to those of the other sub-sections by chosen fractions of the line repeat dimension optical means for simultaneously casting the shadow of said optical grating on to each of said sub-sections means for varying sinusoidally the intensity of the grating shadow incident upon each of said grid sub-sections so that the respective maxima and minima of the variations at such grid sub-sections are equally phase-displaced over the variation cycle, a single photoelectric sensing means positioned to be responsive to the light of said cast shadow passing through each of said sub-sections, reference signal generating means for providing a reference signal which fluctuates in synchronism with the operation cycle of said intensity varying means and means for directly comparing the output signal from said photo-sensing means with said reference signal.

6. Apparatus according to claim 5 which comprises means for cyclically changing a chosen characteristic of the light used to cast said shadow during each intensity variation cycle and filtering means adjacent each of said composite grid sub-sections for selecting only light having a chosen and different value of said characteristic for transmission to said single photoelectric sensing means.

7. Apparatus according to claim 6 in which said chosen characteristic is the polarization direction of said light.

8. Apparatus according to claim 6 in which said chosen characteristic is the colour of said light.

9. Apparatus according to claim 7 which includes a continuously rotatable disc of vectographic material disposed in the light beam forming the shadow incident on said composite grid and light polarization filters having suitably different polarization directions disposed in front of said composite grid sub-sections.

10. Apparatus according to claim 8 which includes a continuously rotatable colour modulating disc disposed in the light beam forming the shadow incident on said composite grid and colour filters of suitably different pass bands disposed in front of said composite grid sub-sections.

11. Apparatus in accordance with claim 9 which includes reference signal generator means coupled for operation by means rotating said rotatable disc.

12. Apparatus in accordance with claim 5 which includes means for providing a plurality of separate light beams whose respective intensities vary sinusiodally during each operation cycle with different instants of maximum intensity.

13. Apparatus in accordance with claim 12 which includes a plurality of separate light sources arranged for energization by different phases of a polyphase electric supply.

14. Apparatus in accordance with claim 12 which includes a single light source of constant intensity and a plurality of electric signal controlled light modulators arranged for control by different phases of a polyphase electric supply.

15. Apparatus according to claim 13 in which said polyphase supply is the normal three-phase public supply mains.

16. Apparatus according to claim 13 in which said polyphase supply is an electronic oscillator.

17. Apparatus in accordance with claim 10 which includes reference signal generator means coupled for operation by means rotating said rotatable disc.

18. Apparatus as described in claim 5 wherein the composite optical grid comprises a plurality of sub-sections, each respective sub-section having the same line repeat pattern, two sections being side-by-side and the third extending across one end of each of the aforementioned two sub-sections.

* * * * *